United States Patent [19]

Tremblay

[11] Patent Number: 4,505,264

[45] Date of Patent: Mar. 19, 1985

[54] ELECTROMAGNETIC WAVE CONCENTRATOR

[75] Inventor: Réal Tremblay, Quebec, Canada

[73] Assignee: Universite Laval, Quebec, Canada

[21] Appl. No.: 565,758

[22] Filed: Dec. 27, 1983

[51] Int. Cl.³ ............................................... F24T 3/02
[52] U.S. Cl. .................... 126/439; 350/286; 350/96.18
[58] Field of Search ............... 126/440, 439; 350/286, 350/96.18

[56] References Cited

U.S. PATENT DOCUMENTS

| | | |
|---|---|---|
| 2,282,862 | 8/1981 | Soleau . |
| 3,390,334 | 7/1968 | Imai . |
| 3,514,192 | 5/1970 | DeLaCierva ........................ 350/286 |
| 4,074,704 | 2/1978 | Gellert . |
| 4,078,548 | 3/1978 | Kapany ............................... 126/440 |
| 4,270,981 | 6/1981 | Stark . |
| 4,337,758 | 7/1982 | Meinel et al. . |
| 4,344,417 | 8/1982 | Malecek ............................... 126/440 |

FOREIGN PATENT DOCUMENTS

| | | |
|---|---|---|
| 1022817 | 12/1977 | Canada . |
| 1097169 | 3/1981 | Canada . |
| 1105339 | 7/1981 | Canada . |
| 1123292 | 5/1982 | Canada . |
| 851313 | 7/1981 | U.S.S.R. ............................... 350/286 |

*Primary Examiner*—Samuel Scott
*Assistant Examiner*—B. J. Bowman
*Attorney, Agent, or Firm*—Robic, Robic & Associates

[57] ABSTRACT

Electromagnetic wave concentrator, especially a solar energy concentrator, in the form of a thin plate made up of a succession of identical light coupling modules each made up of two identical prisms made of transparent materials and having different indexes of refraction. The physical characteristics of the prisms are selected to cause continuous bending of the light beams, striking an incident face of the concentrator, toward a terminal edge surface of the concentrator plate.

17 Claims, 11 Drawing Figures

ELECTROMAGNETIC WAVE CONCENTRATOR

The present invention relates to an improvement in electromagnetic wave concentrators, such as solar energy concentrators, for example.

Various types of light or solar energy concentrators, of interest herein, have been proposed such as those disclosed in Canadian Pat. Nos. 1,022,817 of 1977; 1,097,169 of 1981; 1,105,339 of 1981 and 1,123,292 of 1982 and U.S. Pat. Nos. 3,393,034 of 1968 (corresponding to French Pat. No. 1,442,592); 4,074,704 of 1978; 4,270,981 of 1981; 4,282,862 of 1981; 4,337,758 of 1982. The most pertinent of these devices are those of U.S. Pats. Nos. 4,074,704 and 4,282,862 which use a planar array of prisms intended to refract light which is then concentrated by being deflected, behind the prisms, toward a common end of the concentrator. It is found that, possibly because of the light concentration taking place behind the light incidence prisms, the efficiency of such concentrators is low and they are bulky and cumbersome as well.

It is consequently a main object of the present invention to provide a concentrator of electromagnetic waves capable of a high wave concentration while being in the form of a thin plate, that may be called a multidielectric guiding plate. For convenience, such electromagnetic wave concentrators will, hereinafter, be referred to simply as light concentrators, although they apply to all other types of electromagnetic waves.

It is a further object of the present invention to provide a concentrator of the above type made of transparent materials and in a manner such as to cause deviation and guiding, between its flat faces, of light impinging upon one on its faces and concentrated on one of its two terminal edge surfaces.

Thus, the present invention proposes a concentrator capable of transferring a light flow, incident upon one of the faces of a thin plate, to a terminal edge surface of the plate which is much smaller. The concentration factor is therefore proportional to the ratio of the surface of the guiding plate over the terminal surface of the plate where the light energy is concentrated. It will therefore be of interest to use plates of which the light impinging surfaces are as large as possible and of which the thickness is as small as possible.

By concentration factor is meant the ratio of the mean energy density arriving at the edge surface of the plate where the light concentration takes place divided by the flux of incident energy striking the concentrator.

An additional object of the invention lies in the provision of a light concentrator in which the concentration area is an integral part of the multidielectric guiding plate itself, resulting in a concentration system which is far less cumbersome than presently known systems.

The principle of operation of such a guiding plate calls for the following optical phenomena:

1. A module capable of coupling light by total internal reflection at the intersection of two transparent dielectric media having different indexes of refraction;

2. a manner of guiding the light by the use of prismatic elements alternatingly distributed along the guiding plate;

3. the coupling module is also an element of the periodic network that serves as a guide.

Accordingly, the invention is herein broadly claimed as an electromagnetic wave concentrator in the form of a substantially flat thin plate having an e.m. wave striking surface and a surface opposed to the striking surface, the surfaces intersecting terminal edge surfaces at the ends of the plate; wherein the plate is formed of a succession, between the terminal edge surfaces, of identical e.m. wave coupling modules abutting one another, each constituted of a pair of prisms meeting on a common surface and made of transparent materials of refraction indexes $n_1$ and $n_2$; wherein the bases of the prisms of index $n_1$ are located in the e.m. wave striking surface and the bases of the prisms of index $n_2$ are located in the opposed surface; wherein the successive modules abut one another with a prisms of index $n_1$ immediately following a prism of index $n_2$; wherein $n_2 \geq 1$ and $n_1 > n_2$; wherein each prism has the following further parameters with respect to an angle $\theta_1$ of wave incidence upon the striking surface $$\theta_2 \geq \theta_{2c}$$

$$\theta_{2c} = \sin^{-1}(n_2/n_1)$$

$$\theta_{11} \geq \theta_{2c} - \theta_a$$

$$\theta_1 \geq \sin^{-1}[n_1 \sin(\theta_{2c} - \theta_a)]$$

and wherein $\theta_2$ is the angle of wave incidence upon the common surface; $\theta_{2c}$ is the critical value of the angle $\theta_2$ for total internal wave reflection; $\theta_{11}$ is the angle of refraction of the waves incident upon the striking surface; and $\theta_a$ is the base angle of the prism of index $n_1$ defined by the striking surface and the common surface, whereby waves incident upon the bases of the prisms of index $n_1$ is refracted in the said prisms, then totally reflected at said common surface and thereafter refracted by the successive prisms, being thus bent toward one of the terminal edge surfaces to concentrate thereon.

Embodiments of the invention will now be described with reference to the appended drawings wherein.

Figure 5A:
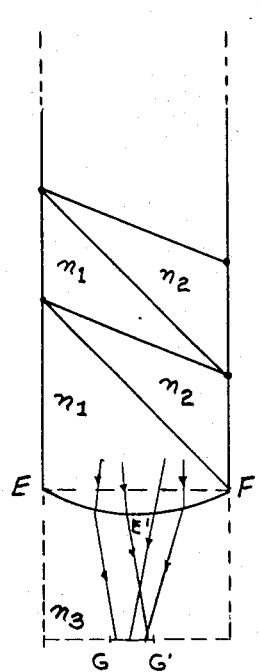
Figure 5B:
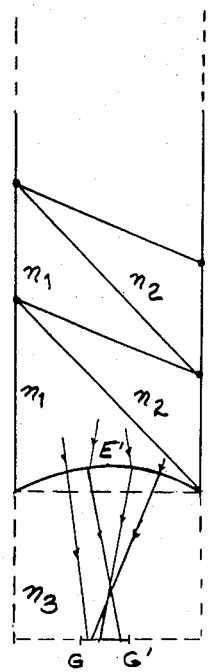

FIGS. 5, a, b and c, are diagrammatic illustrations of concentrators having differently shaped concentration edges, and FIGS. 6, a, b and c, are diagrammatic illustrations of concentrators having differently shaped light striking and opposed surfaces.

Figure 1A:
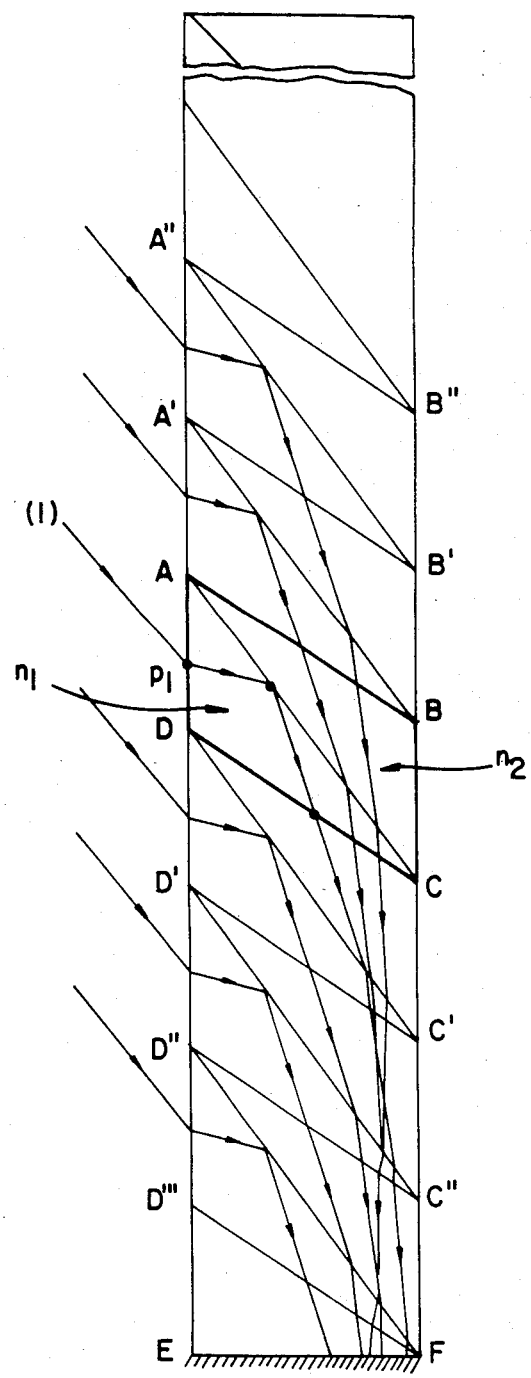
FIGS. 1a and 1b are diagrammatic side elevation views of a light concentrator made according to the present invention.
Figure 1B:
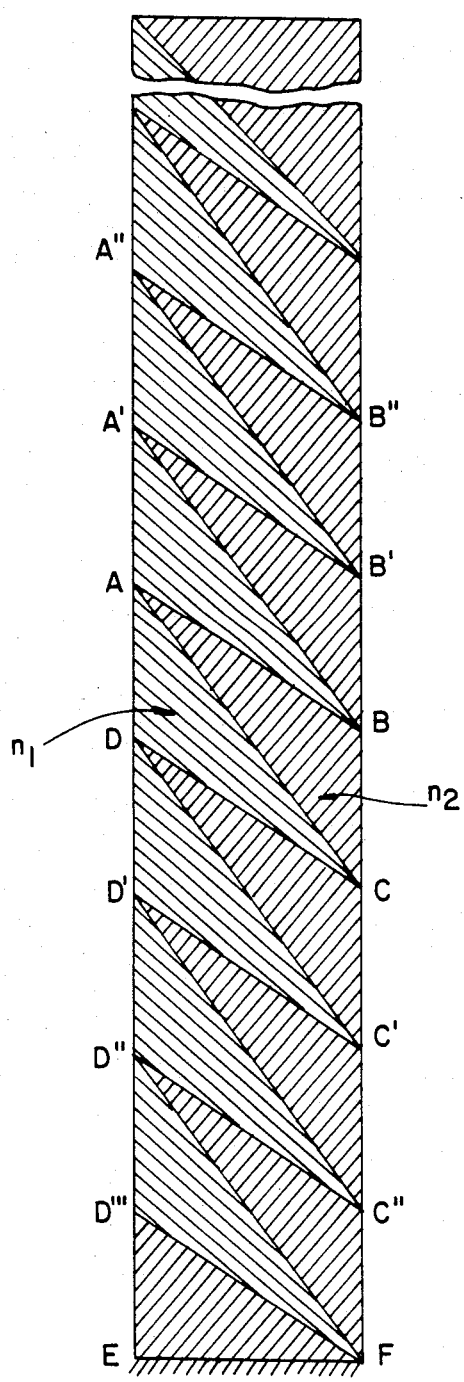

With reference to FIG. 1, the element ABCD is a coupling module. Each coupling module is made up of two prisms of transparent dielectric materials having different indexes of refraction: the prism ABC having an index $n_2 \geq 1$ and the prism ACD has an index of refraction $n_1 > n_2$. The light ray 1 which strikes the face AD of the prism ACD at point $p_1$ is refracted into the medium of index $n_1$. Thereafter, this ray meets the separation surface AC between the two media of different indexes $n_1$ and $n_2$ at point $p_2$ and it is totally reflected since $n_1 > n_2$. The ray then leaves the coupling module at point $p_3$. By arranging several identical coupling modules in succession and in parallel, the faces A″A′, A′A, AD, DD′, etc. . . . define the inlet or striking surface of the guiding plate whereas the faces B″B′, B′B, BC, CC′, etc. . . . define the other or opposed surface of the guiding plate.

The ray which leaves the coupling module ABCD at point $p_3$ is refracted successively in the coupling modules DCC'D', D'C'C''D'' etc... and is thus guided along the plate to finally reach the terminal edge surface EF of the plate through a terminal prism D''' EF. The coupling modules being identical, all rays parallel to the ray 1 will have the same trajectory as that of the said ray 1, these trajectories being simply moved upwards or downwards depending on the coupling module on which they impinge. Most of these rays end up on the terminal edge EF of the guiding plate of which the surface is far smaller than the striking surface of the plate. There follows a concentration effect of the light energy over a surface which is an integral part of the very plate which serves to collect the light energy.

If one or the two dielectric media are liquids, a confining wall or walls of materials transparent to light and of a refraction index similar to the refraction index of the liquid retained by this wall or walls must of course be provided to contain the liquid. In the case where both media are liquids, the separation surface between these liquids must have a refraction index such that the losses by reflexion at the surfaces of separation of the wall with the media $n_1$ and $n_2$ are minimized as much as possible.

Thus, prismatic elements A''B''B'A', ABCD, DCC'D', D'C'C''D'', etc... are identical coupling modules which make use of the phenomenon of total internal reflection. Light coupled to the plate is guided between the bounding surfaces of the plate by the prismatic elements, the latter being themselves coupling elements or, in other words, each of the coupling elements is at the same time an element of the periodic network which serves as a guide.

Figure 2:
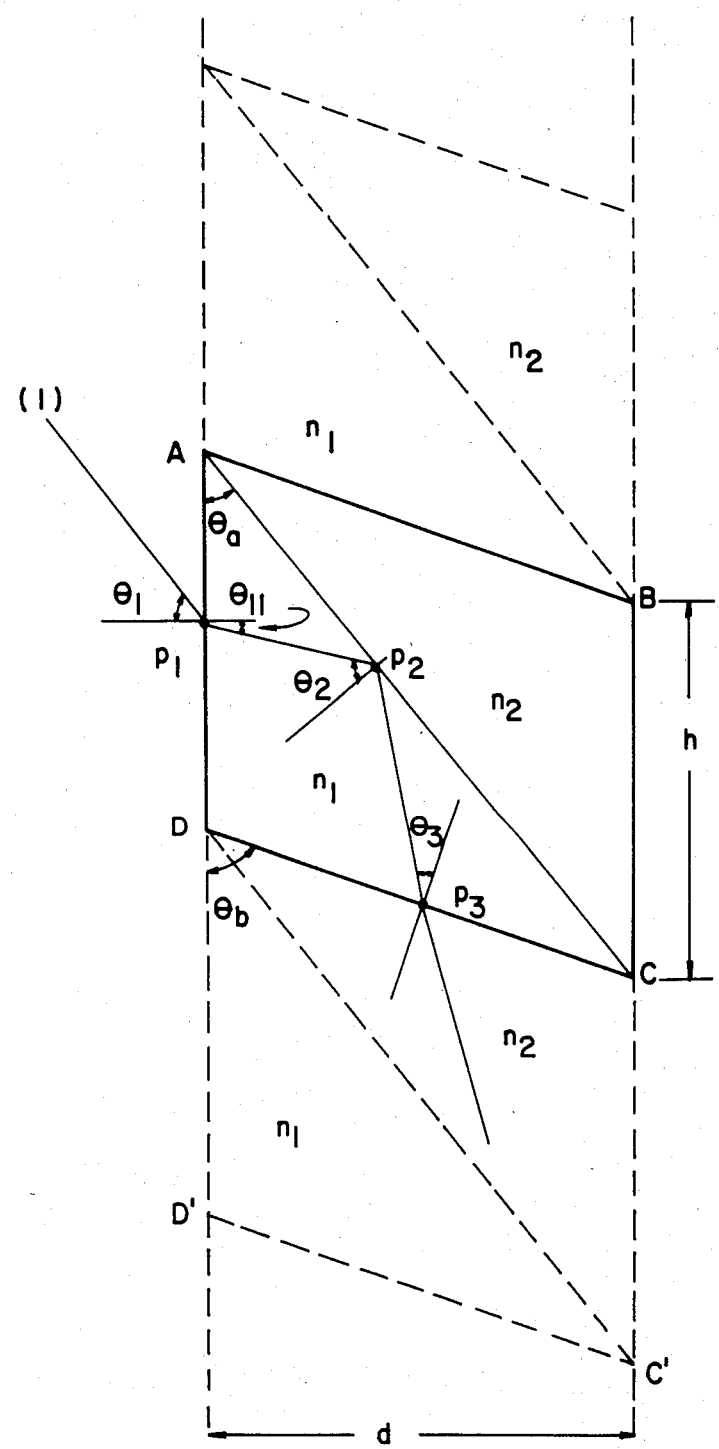
FIG. 2 is a diagrammatic side elevation view of a portion of FIG. 1, on a larger scale.

FIG. 2 is a transverse cross-section of a coupling module from which can be determined the relations between the various parameters of a guiding plate.

It is assumed that the two dielectric media have indexes $n_1$ and $n_2$ with $n_1 > n_2$. The prism ABC is a medium of index $n_1$ and the prism ACD is one of index $n_2$. AC is the separation surface or common surface of the two media. The apex angle A of the prism ACD is $\theta_a$.

A light ray 1 incident at point $p_1$ is refracted into the medium of index $n_1$ and thereafter strikes the common surface AC at point $p_2$. The light ray is completely reflected at point $p_2$ provided that the angle of incidence $\theta_2$ at that point be equal to or greater than the critical angle $\theta_{2c} = \sin^{-1}(n_2/n_1)$ at that point. This implies that the angle of refraction $\theta_{11}$ at point $p_1$ be equal to or greater than $(\theta_{2c} - \theta_a)$ and that the angle of incidence $\theta_1$ at point $p_1$ be equal to or greater than $\sin^{-1}[n_1 \sin(\theta_{2c} - \theta_a)]$. A minimum angle of incidence $\theta_1$ min at point $p_1$ thus exists for which there is total reflection at point $p_2$.

The above relations are algebraically expressed as follows:

$$\theta_2 \geq \theta_{2c}$$

$$\theta_{2c} = \sin^{-1}(n_2/n_1)$$

$$\theta_{11} \geq \theta_{2c} - \theta_a$$

$$\theta_1 \geq \sin^{-1}[n_1 \sin(\theta_{2c} - \theta_a)]$$

and wherein, as mentioned above, $\theta_2$ is the angle of light incidence upon the common surface AC; $\theta_{2c}$ is the critical value of angle $\theta_2$ for total internal light reflection; $\theta_{11}$ is the angle of refraction of the light incident upon the striking surface AD; and $\theta_a$ is the base angle of the prism of index $n_1$ defined by the striking surface AD and the common surface or separating surface AC.

All rays striking the inlet face AD of a coupling module with angles of incidence $\theta_1$ greater than $\theta_1$ minimum impinge the separation surface AC with angles of incidence $\theta_2$ greater than the aforesaid critical angle and are therefore all completely reflected.

For angles of incidence, at point $p_1$, that are smaller than the minimum angle of incidence $\theta_1$ min, a portion only of the light is reflected at point $p_2$.

The guiding plate is therefore, so to speak, limited to guiding light rays impinging one of its faces with a minimum angle of incidence. The latter becomes a feature of the coupling module and thus of the guiding plate. This minimum angle of incidence is a function of the manner with which the guiding plate is constructed and of the materials used for constructing it. It is possible to change the minimum angle of incidence by changing one of several of the parameters $n_1$, $n_2$ and $\theta_a$, that is, by changing the nature of the materials or the configuration of the coupling prism.

The angle $\theta_b$, which is the supplement of the apex angle at point D of the prism ACD is selected so as to be greater to or equal to the angle of refraction at point $p_1$ when the angle of incidence at point $p_1$ is $\theta_1$ min. Expressed otherwise, the base angle ADC is selected according to the following relation:

$$\theta_b \geq 90 - \theta_{11}$$

for a minimum value of $\theta_1$ suitable to ensure full reflection of light within a module ABCD.

The above selection of $\theta_b$ is desired due to the fact that when the point $p_1$ is located near the apex D, it cannot be avoided that part of the light rays refracted at point $p_1$ meet the separating face DC, between two adjoining modules, before having met the separation or common surface AC of a module.

After having been reflected at point $p_2$, the ray 1 meets the separation surface DC at point $p_3$, surface DC separating two successive coupling modules. This light ray passes from a medium of index $n_1$ to a medium of index $n_2$ with $n_1$ greater than $n_2$, but the angle of incidence $\theta_3$ at this point being smaller than the critical angle, there will be refraction of most of the energy of the ray toward the medium of index $n_2$.

The rays leaving the separation surface DC at a point $p_3$, close to apex C, meet the surface CC' and are there in most cases totally reflected before being successively deviated by the other coupling modules.

As FIG. 1 shows, the ray 1 is thereafter successively deviated by the other coupling modules and thus guided toward the terminal edge surface EF of the plate. The deviation of the ray caused by each of the coupling and guiding modules is directly related to the difference in index between the two dielectric media ($\Delta n \mp n_1 - n_2$).

The height h of each coupling module is a function of the thickness d of the plate. By increasing the thickness d, the height h of each module is increased in the same proportion.

There are losses of energy associated with the light transmission within the plate, these losses are produced (a) by partial reflection at each of the surfaces that separate media having different indexes;

(b) by absorption within the dielectric materials.

However, by appropriately selecting the various optical and geometrical parameters, (and/or by coating the surfaces separating different media with anti-reflexion layers) it is possible to design a system wherein the losses by reflection are relatively small and which permit propagation on an extended length and a concentration factor having much interest in several applications.

A model has been experimentally tried in laboratory. The following parameters were used:

| $n_1$ = 1,5 (acrylic) | $n_2$ = 1,33 (water) |
|---|---|
| d = 6.0 cm | $\theta_{1\ min}$ = 50° |

The behavior of the rays is indeed that expected from the theory of geometrical optics.

The table 1 that follows gives the theoritical results obtained for a plate having 7 coupling modules and of which the optical and geometrical parameters are: $n_1=1.5$, $n_2=1.33$, $\theta_{1\ min}=50°$, $\theta_a=31.7°$, $\theta_b=55.3°$. The ratio H/d between the height H of the plate and its thickness d is 7.2.

TABLE 1

| $\theta_1$ | $F_c$ | % E |
|---|---|---|
| 50 | 3,7 | 81 |
| 55 | 3,2 | 80 |
| 60 | 2,6 | 75 |
| 65 | 2,0 | 72 |

The angle of incidence $\theta_1$ is given in the first column. The concentration factor $F_c$* obtained on the terminal surface EF with respect to a unit concentration incident upon the striking surface of the plate is given in the second column. %E is the percentage of the energy that penetrates into the plate and that is available on the terminal surface EF of the plate. No account has been made of the losses due to absorption in the dielectric materials, losses that are small in the case under consideration.
see definitin of $F_c$ on page 2, above.

The maximum number of coupling modules that may be placed one next to the other is mainly limited by the fact that the rays, coupled by the coupling modules located furthest from the terminal edge surface EF of the plate, may lose a large part of their energy by refraction into the air. This refraction into the air is due to the fact that, after having been deviated several times by the guiding modules, these rays may reach one of the faces of the plate with an angle of incidence such that they may escape from the plate. It follows that this phenomenon may limit the ratio height of the plate over thickness of the terminal edge of the plate and thus likewise limit the concentration factor.

For the applications being considered, light guide, flat concentration solar collector, the proposed system is that much more of interest that the distance travelled by the rays guided between the faces of the plate is greater for a given thickness of the plate.

This maximum height H is a function of the optical parameters of the medium and of the thickness of the plate.

For a given number of coupling modules, a solution for increasing the height H of the plate is to increase its thickness d. The height h of a coupling module being directly related to the thickness of the plate, an increase in the thickness d increases the height H in the same proportions. In such a case, the quantity of light coupled in the plate is increased without increasing in concentration factor over the terminal edge surface EF and without increasing the ratio H/d. Furthermore, this solution is not interesting as it implies a larger quantity of materials of indexes $n_1$ and $n_2$ per unit of surface necessary to couple the energy in the guiding plate. This is therefore not the solution for increasing the distance that the rays could travel between the faces of the plate.

Figure 3:
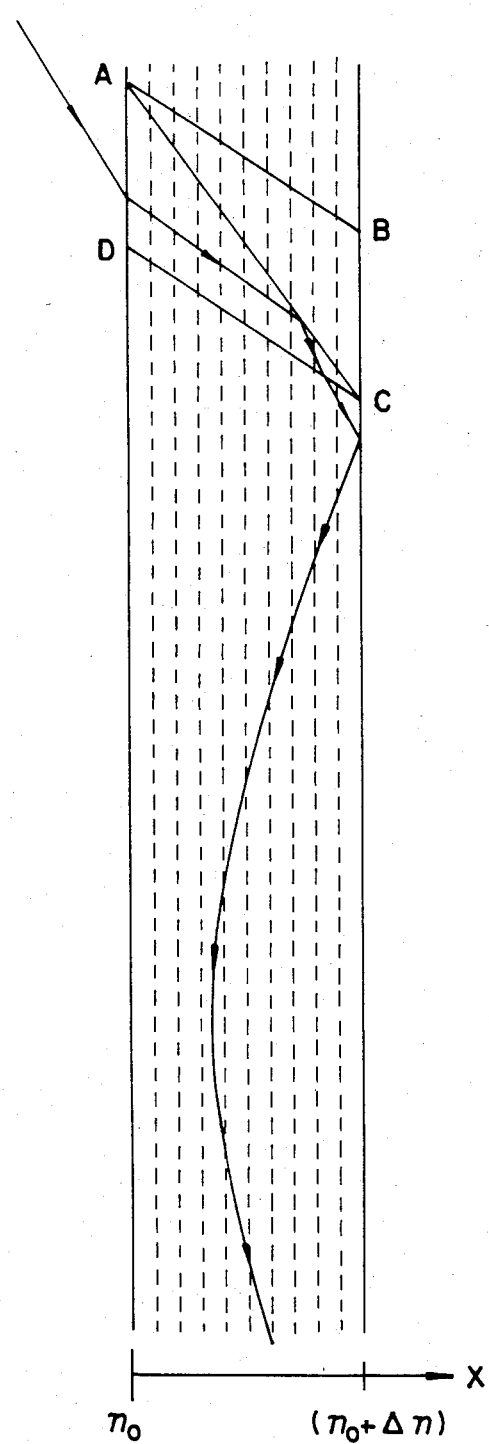
FIGS. 3 and 4 are diagrammatic elevation views of another embodiment of the invention.

Another solution would reside in the construction of a guiding plate with materials having a variable refraction index. Following research work in integrated optics, there exists presently the possibility of making transparent dielectric media with a variable index (for instance SELFOC ROD LENS). FIG. 3 of the drawing shows a plate of which the index varies according to the relation $n_v = n_o(1 + (Ax^2/2))$, where $n_o$ is the index at x=0 and A is a constant, X being the distance from the base AD to the point under consideration. Thus, x=0 expresses the situation where the point at which the index is being determined is located on the face AD. Such a plate would deviate a ray between its walls along a trajectory shown in FIG. 3.

Here is a solution suitable to solve the problem of energy being lost due to the rays escaping from the guiding system by refraction into the air. It lies in providing a coupling module made, as above, of two prisms wherein the index of refraction would vary continuously between the bounding faces of each prism. Thus, for one prism, the index would be $n_1$ at the inlet face AD and would vary continuously until the index be $(n_1 + \alpha n)$ at the other face AC. For the other prism, it would vary from $n_2$ to $(n_2 + \Delta_n)$ when moving from faces AC to BC.

Such a system would have the following particular features.

Figure 4:
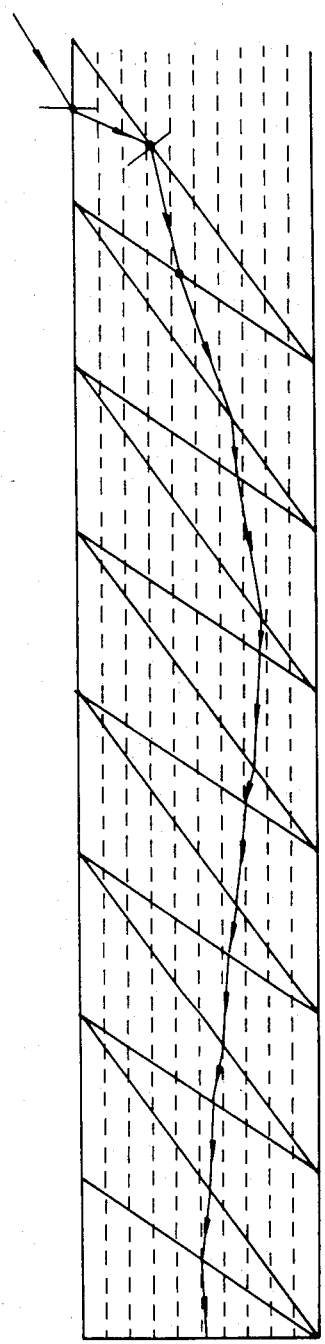

(a) an index difference $(n_1 - n_2)$ remains at each point of the surface of separation AC between media 1 and 2 so that the coupling modules can still, by total inner reflection, couple the energy between the faces of the plate;

(b) the rays, as they move between the faces of the plate, are again subjected to deviations due to the refraction as they move from one medium to the other, the totality of these deviations tending to cause the rays to rotate clockwise (FIG. 1);

(c) the rays in moving along between the faces of the plate are subjected to the effect of a medium having a variable index, whether they be in the medium 1 or the medium 2, this effect tending to cause deviation of the rays counterclockwise (FIG. 3);

(d) the combined effects (b) and (c) cancel one another thereby allowing the rays to cover much greater distances for a given thickness d of the plate (FIG. 4).

In such systems, the number of successive coupling modules that can be placed one against the other is limited by:

(a) small losses due to partial reflection of rays at each of the surfaces that separate media having different indexes;

(b) the absorption in the dielectric materials, (c) the diffusion due to the dielectric materials not being homogenous.

Instead of varying continuously, the index could be made to vary by steps by superposing a few layers of media having different indexes.

With reference to the particular embodiments of FIG. 5, the terminal edge concentration surface may be of a shape other than the straight edge EF of FIGS. 1, 3 and 4.

It could have a shape such that a very large portion of the rays guided between the surfaces of the guiding plate be refracted, at the separation surface EE'F, in a direction such that they would then concentrate in a zone of which the section GG' would be smaller than the edge surface EF corresponding to the thickness of the plate. This would automatically increase the concentration factor Fc. The shape of the edge surface EE'F will be a function of the orientation, of the distribution and of the intensity of each ray at the terminal edge of the plate as well as a function of the indexes of the dielectric media on either side of the separation edge surface EE'F.

With reference to FIGS. 5, (a) to (c), here are some non-limitative examples of the shape that the edge surface of the plate could take if most of the rays were nearly parallel to the confining surfaces of the guiding plate.

If the medium of index $n_1$ is such that $n_1 > n_3$, the edge surface EE'F should be convex and if the medium of index $n_3$ is such that $n_1 < n_3$, the edge surface should then be concave.

Figure 5C:
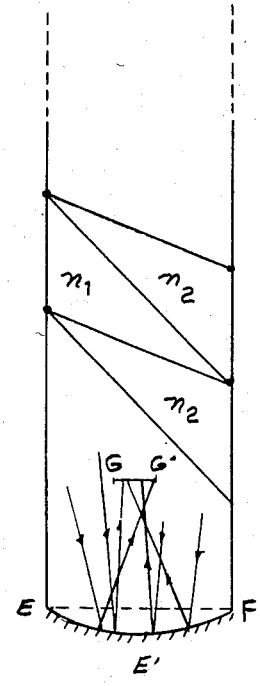

Another way of increasing the concentration factor, while retaining the energy within the medium of index $n_1$, would be to give the edge surface EE'F a convex shape and to coat surface EE'F with a reflecting material. The rays reflected by the coated surface would concentrate in an area of the medium of index $n_1$ of which the section GG' would be smaller than the edge surface EF. (FIG. 5c)

Figure 6A:
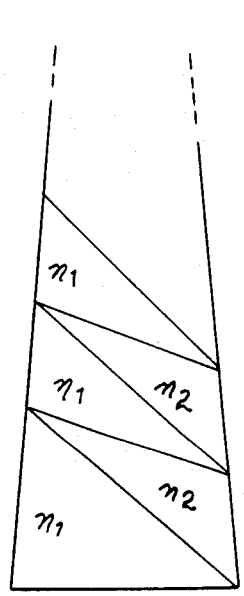
Figure 6B:
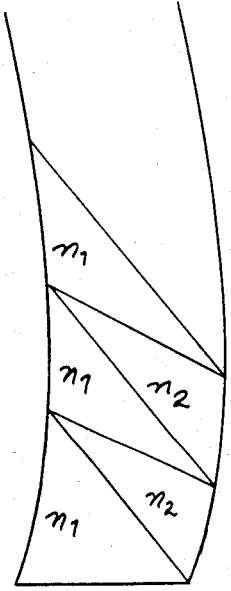
Figure 6C:
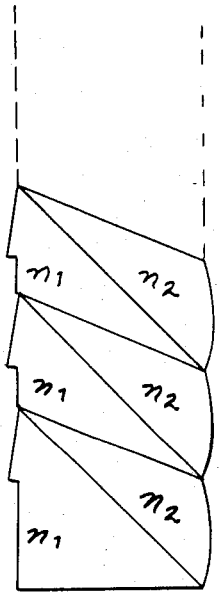

With reference to FIG. 6, it is not absolutely necessary that the e.m. wave striking surface and the opposed surface of the guiding plate be parallel as in FIG. 1. They could be tapered, as in FIG. 6(a) or curved as in FIG. 6(b). They could also be both, or one only, discontinuous, as in FIG. 6(c). In the latter case, the base of each prism of index $n_1$ is sawtooth in configuration and/or the base of each prism of index $n_2$ is concave.

To resume, the present invention proposes a multidielectric guiding plate which can serve as polychromatic guide and of which the essentially planar surface has a minimum bulk in the case where it is applied to a flat e.m. wave concentrating collector. This plate could also be integrated into a modular system which would use several plates so arranged as to increase the energy concentration factor in a predetermined region.

In applications where the results given in Table 1 above would be satisfactory, materials commonly found in construction could be used.

I claim:

1. An electromagnetic wave concentrator in the form of a substantially flat thin plate having an electromagnetic wave striking surface, a surface opposed to said striking surface, and a pair of terminal edge surfaces intersected by said striking and opposite surfaces, wherein said plate is formed of a succession, between said terminal edge surfaces, of electromagnetic wave coupling modules abutting one another, so as to form a flat plate-like structure, each of said modules consisting of a pair of prisms meeting on a common surface and made of transparent materials of refraction indexes $n_1$ and $n_2$, said prism each having a base and an external surface joining said base to the common surface wherein the bases of the prisms of index $n_1$ are located in said wave striking surface and the bases of the prisms of index $n_2$ are located in said opposed surface; wherein said successive modules abut one another with the external surface of a prism of index $n_1$ abutting the external surface of a prism of index $n_2$; wherein $n_2 \geq 1$ and $n_1 > n_2$; wherein each prism has the following further parameters wwith respect to an angle $\theta_1$ of wave incidence upon said striking surface $\theta_2 \geq \geq_{2c}$ $\theta_{2c} = \sin^{-1}(n_2/n_1)$ $\theta_{11} \geq \theta_{2c} - \theta_a$ $\theta_1 \geq \sin^{-1}[n_1 \sin(\theta_{2c} - \theta_a)]$ and wherein $\theta_2$ is the angle of wave incidence upon said common surface; $\theta_{2c}$ is a critical value of the angle $\theta_2$ for total inner wave reflection; $\theta_{11}$ is the angle of refraction of the waves incident upon said striking surface; and $\theta_a$ is the base angle of the prism of index $n_1$ defined by said striking surface and said common surface, whereby waves incident upon the bases of said prisms of index $n_1$ are refracted in the said prisms of index $n_1$, then totally reflected at the said common surface and thereafter refracted by said successive modules, being thus bent toward one of said terminal edge surfaces to concentrate thereon.

2. A concentrator as claimed in claim 1, wherein the supplemental angle $\theta_b$ to the other base angle of each prism of base angle $\theta_a$ is selected according to the following relation:

$\theta_b \geq 90 - \theta_{11}$ for a minimum value of $\theta_1$ suitable to ensure full reflection of light within said modules.

3. A concentrator as claimed in claim 1, wherein at least one of said prism of each module is a liquid.

4. A concentrator as claimed in claim 1, wherein said prisms are made of a material having a variable index $n_v$ of refraction.

5. A concentrator as claimed in claim 2, wherein said prisms are made of a material having a variable index $n_v$ of refraction.

6. A concentrator as claimed in claim 4, wherein said variable index $n_v$ is, at a predetermined point in said prisms, equal to $$n_o (1 + (Ax^2/2))$$

wherein $n_0$ is the value of the index at the base of the prism being considered; x is the distance from the striking surface to said predetermined point and A is a constant.

7. A concentrator as claimed in claim 5, wherein said variable index $n_v$ is, at a predetermined point in said prisms, equal to $$n_o (1 + (Ax^2/2))$$

wherein $n_o$ is the value of the index at the base of the prism being considered; x is the distance from said striking surface to said predetermined point and A is a constant.

8. A concentrator as claimed in claim 1, wherein the prism of index $n_1$ is acrylic and the prism of index $n_2$ is water.

9. A concentrator as claimed in claim 2, wherein the prism of index $n_1$ is acrylic and the prism of index $n_2$ is water.

10. A concentrator as claimed in claim 1, wherein said wave striking and opposed surfaces are parallel.

11. A concentrator as claimed in claim 1, wherein said wave striking and opposed surfaces are tapered between said terminal edge surfaces.

12. A concentrator as claimed in claim 11, wherein said wave striking and opposed surfaces are curved.

13. A concentrator as claimed in claim 1, wherein the base of each prism of index $n_1$ is saw-tooth in configuration and/or the base of each prism of index $n_2$ in convex.

14. A concentrator as claimed in claim 1, wherein said one terminal edge surface is straight.

15. A concentrator as claimed in claim 1, wherein said one terminal edge surface is convex.

16. A concentrator as claimed in claim 15, wherein said convex surface is coated with a reflection material.

17. A concentrator as claimed in claim 1, wherein said one terminal edge surface is concave.

* * * * *

UNITED STATES PATENT AND TRADEMARK OFFICE
CERTIFICATE OF CORRECTION

PATENT NO. : 4,505,264
DATED : March 19, 1985
INVENTOR(S) : Real Tremblay

It is certified that error appears in the above-identified patent and that said Letters Patent is hereby corrected as shown below:

IN THE SPECIFICATION:

Column 5, line 40: "definitin" should read --definition-- and "page 2" should read --column 1, line 47--;
line 68: "increasing in" should read --increasing the--;

Column 6, line 16: "$n_v = n_o (1+(Ax^2/2))$" should read --$n_v = n_o [1 + (Ax^2/2)]$--;
line 17: "X" should read --x--;
line 32: "$n_1 + \alpha n$" should read --$n_1 + \Delta n$--;
line 33: "$n_2 + \Delta_n$" should read --$n_2 + \Delta n$--;

Column 8, line 5: "wwith" should read --with--;
line 8: "$\theta_2 \gtrless \theta_{2c}$" should read --"$\theta_2 \gtrless \theta_{2c}$"--.

Signed and Sealed this

Fifth Day of November 1985

[SEAL]

Attest:

Attesting Officer

DONALD J. QUIGG

Commissioner of Patents and Trademarks